Dec. 21, 1926.
H. L. CARR
CULTIVATOR TOOTH
Filed Dec. 3, 1924
1,611,337
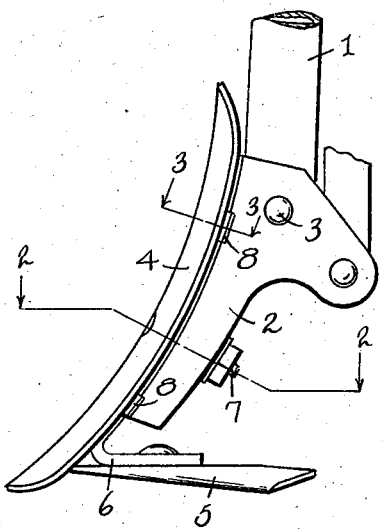
Fig. I.
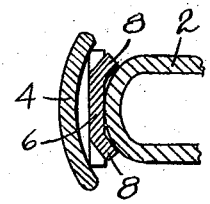
Fig. III.
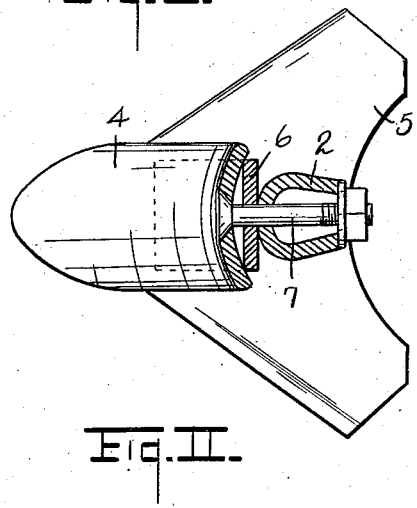
Fig. II.
INVENTOR
Harry L. Carr
BY
Chappell & Earl
ATTORNEYS Patented Dec. 21, 1926.

1,611,337

UNITED STATES PATENT OFFICE.

HARRY L. CARR, OF HASTINGS, MICHIGAN, ASSIGNOR TO PURNELL & CARR MANUFACTURING CO., OF HASTINGS, MICHIGAN.

CULTIVATOR TOOTH.

Application filed December 3, 1924. Serial No. 753,684.

This invention relates to improvements in cultivator teeth.

The main object of this invention is to provide an improved cultivator tooth which is very effective as a weed destroyer.

Objects pertaining to details and economies of my invention will definitely appear from the detailed description to follow.

I accomplish the objects of my invention by the devices and means described in the following specification. The invention is clearly defined and pointed out in the claims.

A structure embodying the features of my invention is clearly illustrated in the accompanying drawing forming a part of this application, in which:

Fig. I is a side elevation of a cultivator tooth embodying the features of my invention, the upper end of the standard being broken away.

Fig. II is a horizontal section on a line 2—2 of Fig. I.

Fig. III is a detail horizontal section on a line 3—3 of Fig. I.

Similar numerals of reference indicate similar parts in all of the views.

Referring to the drawing, the standard of the embodiment illustrated comprises an upper tubular part 1 and a lower section 2 of U cross section formed as a metal stamping, the upper end of this section 2 embracing and being secured to the lower end of the tubular section by means of the rivet 3.

The shovel 4 is a double pointed shovel so that it may be reversed and wear of both ends secured.

I provide a triangular shaped horizontally disposed blade 5 having a shank 6 secured upon the upper side thereof, the shank being disposed between the shovel and the standard and engaged by the clamping bolt 7 arranged through the shovel, the shank 6 and the standard as shown in Fig. II.

The shank 6 is provided with opposed pairs of lugs 8 struck rearwardly therefrom to engage the standard above and below the bolt, thus assisting in maintaining the blade, and its shank may, if desired, be supplied as an attachment for cultivator teeth of a type now in quite common use, it only being necessary to remove the clamping bolt 7, inserting the shank of the blade between the standard and the shovel and reinserting the bolt 7. It is sometimes necessary to provide a longer bolt than that used to secure the shovel only.

My improved cultivator tooth is very efficient as a weed destroyer and in completely stirring the soil. I have shown my improvements as embodied in one type of cultivator tooth now on the market. I have not attempted to illustrate other embodiments or adaptations thereof as I believe this disclosure will enable those skilled in the art to embody or adapt my improvements as may be desired.

Having thus described my invention what I claim as new and desire to secure by Letters Patent is:

1. A cultivator tooth comprising a standard, a shovel, a triangular horizontally disposed blade, a shank for said blade disposed between the standard and shovel with the apex of the blade at the rear of and in spaced relation to the point of the shovel, and a bolt disposed through said shovel, blade shank and standard, said shank having pairs of rearwardly projecting lugs engaging said standard above and below said bolt.

2. A cultivator tooth comprising a standard, a longitudinally and transversely curved shovel, a triangular horizontally disposed blade, a flat shank for said blade disposed between the standard and shovel with the apex of the blade at the rear of and in spaced relation to the point of the shovel, and a bolt disposed through said shovel, blade shank and standard whereby the shank is clamped between the standard and shovel and constitutes a spring tension member for the bolt.

In witness whereof I have hereunto set my hand.

HARRY L. CARR.